United States Patent [19]
Sato et al.

[11] Patent Number: 5,819,187
[45] Date of Patent: Oct. 6, 1998

[54] ELECTRIC VEHICLE PROPULSION SYSTEM AND BATTERIES THEREFOR

[75] Inventors: Noboru Sato; Yasuyuki Sando, both of Wako, Japan

[73] Assignee: Honda Giken Kogyo Kabushiki Kaisha, Tokyo, Japan

[21] Appl. No.: 655,128

[22] Filed: May 28, 1996

[30] Foreign Application Priority Data

May 30, 1995 [JP] Japan .................................. 7-132264

[51] Int. Cl.$^6$ .............................. B60L 11/18; G06F 1/26
[52] U.S. Cl. ................................ 701/1; 701/22; 322/16; 322/38; 320/109
[58] Field of Search .................. 701/1, 22; 320/112, 320/109, 148, 149, 156, 166; 180/65.1, 65.3; 322/16, 28, 38, 39; 318/139, 434

[56] References Cited

U.S. PATENT DOCUMENTS

| | | | |
|---|---|---|---|
| 5,237,259 | 8/1993 | Sanpei | 320/158 |
| 5,280,231 | 1/1994 | Kato et al. | 322/28 |
| 5,550,445 | 8/1996 | Nii | 318/153 |
| 5,600,229 | 2/1997 | Oh | 320/162 |
| 5,614,804 | 3/1997 | Kayano et al. | 320/134 |

OTHER PUBLICATIONS

GM Impact Specifications (month & date are not available).

*Primary Examiner*—Tan Q. Nguyen
*Attorney, Agent, or Firm*—Nikaido, Marmelstein, Murray & Oram LLP

[57] ABSTRACT

An initial output of a secondary battery on an electrically propelled vehicle is set to a value which is at least the sum of an established power output of a motor, an output reduction due to the memory effect of the secondary battery, and an allowable output reduction due to aging of the secondary battery. Since the established power output of the motor is determined taking into account the output reduction due to the memory effect and the output deterioration due to the aging, a minimum power output which the battery has as its capability is prevented from dropping below the established power output within the prescribed number $t=n$ of times that the battery is charged and discharged, even when the output reduction and deterioration take place. Therefore, the driver, which is the user of the electrically propelled vehicle, does not feel a reduction in the power performance of the electrically propelled vehicle, i.e., a reduction in the established power output of the motor, caused by the output reductions of the battery.

5 Claims, 2 Drawing Sheets

ELECTRIC VEHICLE PROPULSION SYSTEM AND BATTERIES THEREFOR

BACKGROUND OF THE INVENTION

1. Field of the Invention

This present invention relates to an electrically propelled vehicle which carries a battery having a memory effect, such as a nickel-cadmium secondary, or rechargable, battery or a nickel-metal hydride secondary battery, for energizing a propulsive motor, and a method of establishing a battery output for such an electrically propelled vehicle.

2. Description of the Related Art

Recently, a nickel-metal hydride secondary battery which is a nickel-based battery that is small and light and has a high output has been considered for use as an energy source for a propulsive motor for an electrically propelled vehicle such as an electric vehicle or the like.

The power output of an electrically propelled vehicle is determined by the power output of a motor mounted thereon, and the power output of the motor is established on the assumption that the motor is supplied with a predetermined amount of electric energy or greater from a battery on the electrically propelled vehicle.

The established power output (rated output) of the motor is limited to a suitable value equal to or smaller than an initial maximum output (simply referred to as an initial output) of the battery in view of aging of the battery. Based on the established power output of the motor, accelerating forces produced upon depression of an accelerator pedal are considered. As well known in the art, deterioration of the battery due to aging thereof appears as a phenomenon which causes a reduction in the output of the battery because of an increase in the internal resistance of the battery upon repeated charging and discharging of the battery.

Another known cause of a reduction in the output of the battery, other than aging of the battery, is a memory effect in a nickel-based secondary battery with a nickel electrode used as a positive electrode, such as a nickel-metal hydride secondary battery or the like. The memory effect is a phenomenon by which the output of the battery is lowered because when the battery is recharged while its DOD (depth of discharge) is small, the voltage across the charged battery becomes lower than when the battery suffers as no memory effect.

One technique to prevent the memory effect from occurring is a so-called reconditioning process for starting to charge a battery after it has been discharged until its depth of discharge becomes about 100% (see Japanese Patent Laid-open No. Hei 5-227671). The reconditioning process can compensate for a reduction which is caused in the output of the battery by the memory effect.

Batteries for use on electrically propelled vehicles should preferably be as small and light as possible and be capable of producing as large an output (output density) as possible to increase the mileage (the distance that the electrically propelled vehicle can travel per charging cycle), the running performance, and the space to accommodate passengers of the electrically propelled vehicle. However, for one type of batteries, the magnitude of the output of the batteries is in substantially inverse proportion to the size and weight thereof.

Therefore, once a battery type is determined, it will be the best way to select, for use on an electrically propelled vehicle, a battery which has a minimum initial output in view of the aging and the memory effect insofar as the battery can maintain an established power output of a motor to be powered by the battery.

Specifically, as shown in FIG. 3 of the accompanying drawings, it is optimum to establish an initial output Pmaxi of a battery upon shipment such that an output reduction Pcn caused in a maximum output Pmax of the battery due to aging when the number t of times that the battery is charged and discharged has reached n cycles (t=n) is equal to an output reduction Pm caused by the memory effect. When the number t of times that the battery is charged and discharged is equal to t=n, it is referred to as the prescribed or guaranteed number of times that the battery is charged and discharged. According to the conventional method of establishing the initial output Pmaxi shown in FIG. 3, the battery is reconditioned to compensate for the output reduction Pm caused by the memory effect when the battery suffers the memory effect. The output of the battery is expressed by a unit [W/kg]=output density.

Even if a battery mounted on an electrically propelled vehicle has a large capacity of 20 kWh or more, for example, and a virtually usable amount of electric energy stored in the battery is about 50% DOD after it has been fully charged (0% DOD), a remaining capacity (remaining energy) of the battery is about 10 kWh. For discharging such a remaining energy from the battery, it takes a discharging system of a 4 kW rating at least two hours to discharge the battery. The remaining energy is wasted if it is simply discharged from the battery.

In addition, actual limitations posed by the present battery technology and the infrastructure which allows the user to utilize commercial electric energy available late at night make it necessary to charge batteries for about 8 hours. Therefore, the above period of time required to discharge batteries to compensate for the memory effect reduces the efficiency with which electrically propelled vehicles are used.

Considering the above situations as a whole, it is expected that since the batteries on electric vehicles, which are believed to become most widespread as electrically propelled vehicles, will be charged late at night almost everyday and will be fully charged on a daily basis, the reconditioning process for compensating for the memory effect which will bring about an electric energy loss will be carried out only in at most holidays, i.e., once in several charging cycles.

If the battery on an electrically propelled vehicle suffers the memory effect when the electrically propelled vehicle is daily used without the reconditioning process upon battery charging, the output of the battery is reduced, and the power output of the motor energized by the battery is limited to a battery output Plm (see FIG. 3) which is lower than an established power output Pl of the motor. At this time, the driver of the electrically propelled vehicle has unacceptable impressions, i.e., feels that the electrically propelled vehicle is poorly accelerated even though he depresses the accelerator pedal in the same way as before and no desired accelerating forces can be obtained even though he further depresses the accelerator pedal.

Since the reduction caused in the output of the battery by the memory effect does not result from a deterioration of the battery, the user is not required to replace the battery, but may possibly replace the battery unnecessarily. When the user excessively depresses the accelerator pedal, the electric circuit for energizing the motor consumes an increased amount of electric energy from the battery, resulting in a reduction in the mileage.

Batteries mounted on electrically propelled vehicles are actually incomparably larger and heavier than batteries mounted on internal-combustion-engine-propelled vehicles. Therefore, it is considerably laborious and tedious to replace such batteries mounted on electrically propelled vehicles.

SUMMARY OF THE INVENTION

It is therefore an object of the present invention to provide an electrically propelled vehicle which is so economic that a battery mounted thereon does not need to be replaced, the established power output of a motor mounted thereon will not be lowered, and the mileage thereof will not be reduced for the prescribed number of times that the battery is charged and discharged, i.e., for an entire period in which the battery can be used, and a method of establishing the initial output of a battery mounted on such an electrically propelled vehicle.

According to the present invention, there is provided an electrically propelled vehicle comprising a propulsive motor having an established power output, and a secondary battery for supplying electric energy to the motor, the secondary battery having a memory effect, the secondary battery having an initial output set to a value which is at least the sum of the established power output of the motor, an output reduction due to the memory effect of the secondary battery, and an allowable output reduction due to aging of the secondary battery.

The initial output of the secondary battery is set to at least 1.4 times the established power output of the motor.

The aging is equal to the prescribed number of times that the secondary battery is charged and discharged.

Alternatively, the aging is equal to a prescribed distance that the electrically propelled vehicle can travel.

The electrically propelled vehicle further comprises a drive source for energizing the motor, the drive source being inserted between the secondary battery and the motor, the initial output of the secondary battery being set to a value including an output reduction caused by an electric loss produced by the drive source.

The secondary battery comprises a nickel-metal hydride secondary battery.

According to the present invention, there is also provided an electrically propelled vehicle comprising a propulsive motor having an established power output, and a nickel-metal hydride secondary battery for supplying electric energy to the motor, the nickel-metal hydride secondary battery having a memory effect, the nickel-metal hydride secondary battery having an initial output set to a value which is 1.4 to 2.52 times the established power output of the motor.

According to the present invention, there is further provided a method of establishing an output of a secondary battery for supplying electric energy to a propulsive motor having an established power output, on an electrically propelled vehicle, the secondary battery having a memory effect, comprising the steps of determining an output reduction due to the memory effect of the secondary battery, determining an allowable output reduction due to aging of the secondary battery, and setting an initial output of the secondary battery to a value which is at least the sum of the established power output of the motor, the output reduction due to the memory effect, and the allowable output reduction due to the aging.

With the above arrangement, the initial output of the secondary battery is set to a value which is at least the sum of the established power output of the motor, the output reduction due to the memory effect of the secondary battery, and the allowable output reduction due to the aging of the secondary battery. Therefore, the output of the battery is prevented from dropping below the established power output of the motor even if the secondary battery suffers the memory effect within the prescribed number of times that the secondary battery is charged and discharged.

Furthermore, the initial output of the secondary battery is set to a value which is at least 1.4 times the established power output of the motor. If the output reduction due to the memory effect is about 15% and the reasonable output reduction due to the aging within the prescribed number of times that the secondary battery is charged and discharged is about 25%, then the sum of the output reductions is about 40%. Consequently, the initial output of the secondary battery that is set to a value which is at least 1.4 times the established power output of the motor is a lower limit value in a reasonable range.

Moreover, the aging is equal to the prescribed number of times that the secondary battery is charged and discharged, or a prescribed distance that the electrically propelled vehicle can travel. Accordingly, the initial output of the secondary battery can easily be established.

In the case where the electrically propelled vehicle further has a drive source, e.g. current control elements, for energizing the motor, the drive source being inserted between the secondary battery and the motor, the initial output of the secondary battery is set to a value including an output reduction caused by an electric loss produced by the drive source. Therefore, the initial output of the secondary battery can be established more accurately.

Because the secondary battery comprises a nickel-metal hydride secondary battery, the electrically propelled vehicle is small and light, and has a good mileage.

Furthermore, on the electrically propelled vehicle which is driven by the motor powered by the nickel-metal hydride secondary battery, the initial output of the nickel-metal hydride secondary battery is set to a value which is 1.4 to 2.52 times the established power output of the motor. The initial output of the nickel-metal hydride secondary battery is set to a value which is at least 1.4 times the established power output of the motor for the reasons described above. The initial output of the nickel-metal hydride secondary battery is set to a value which is at most 2.52 times the established power output of the motor for the following reasons: The nickel-metal hydride secondary battery has an output of 210 W/kg. If a preferable power-to-weight ratio (PW ratio) of the electrically propelled vehicle is 83.3 W/kg, then an upper limit for the initial output is calculated as 210/83.3=2.52. If a lower limit for the battery output for enabling the electrically propelled vehicle to exhibit practical running performance in a traffic environment where gasoline-driven vehicles also run is 25 W/kg, and also if the ratio of the weight of the battery to the weight of the electrically propelled vehicle is preferably smaller than 0.3, then the preferable PW ratio of 83.3 W/kg is obtained as 25/0.3=83.3.

With the method according to the present invention, furthermore, the initial output of the battery can easily be set to an optimum value through the steps of determining an output reduction due to the memory effect of the secondary battery, determining an allowable output reduction due to aging of the secondary battery, and setting the initial output of the secondary battery to a value which is at least the sum of the established power output of the motor, the output reduction due to the memory effect, and the allowable output reduction due to the aging.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
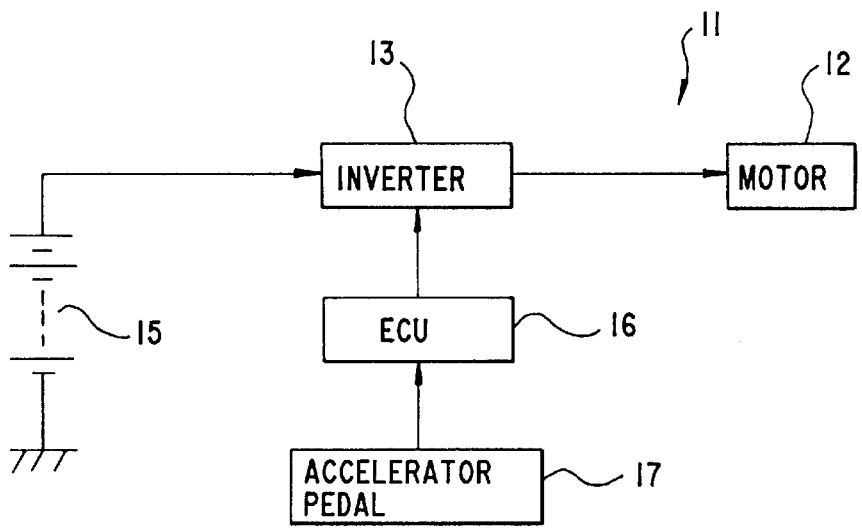
FIG. 1 is a block diagram of a basic arrangement of an electrically propelled vehicle according to an embodiment of the present invention.
Figure 2:
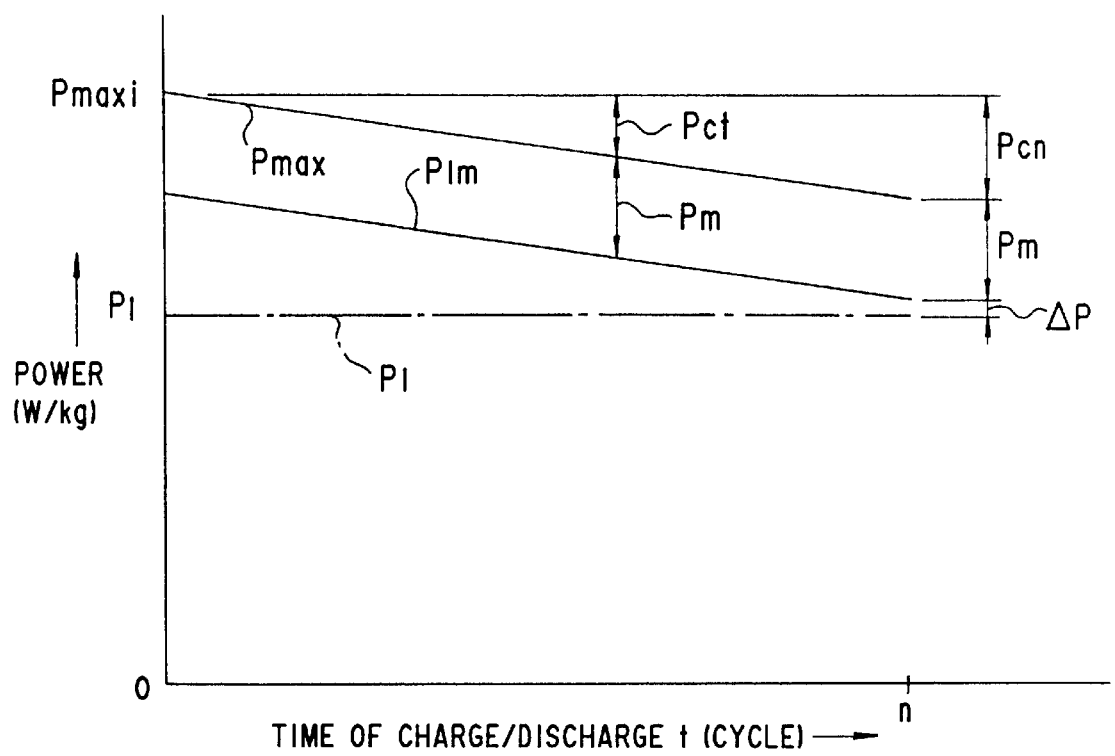
FIG. 2 is a diagram showing characteristic curves illustrative of a method of establishing a battery output according to the embodiment of the present invention.
Figure 3:
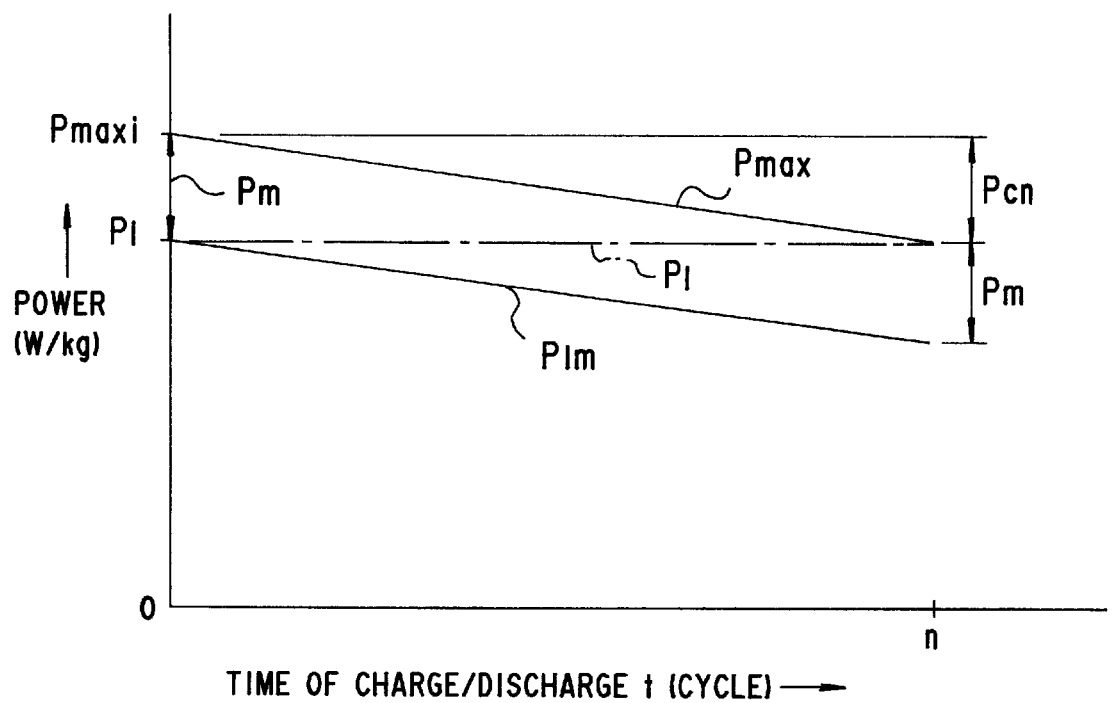
FIG. 3 is a diagram showing characteristic curves illustrative of a conventional method of establishing a battery output.

FIG. 1 shows in block form a basic arrangement of an electrically propelled vehicle 11 according to an embodiment of the present invention. FIG. 2 shows characteristic curves illustrative of a method of establishing a battery output according to the embodiment of the present invention. Those values shown in FIG. 2 which are identical to those shown in FIG. 3 are denoted by identical reference characters, and will not be described in detail below. As shown in FIG. 1, the electrically propelled vehicle 11 has a three-phase AC motor 12 serving as a power source for propelling the electrically propelled vehicle 11. The motor 12 is supplied with electric energy from a battery 15 through an inverter 13 which is a drive source for energizing the motor 12. A power output of the motor 12 is controlled by an ECU (electronic control unit) 16 which is a propulsion control means for controlling the duty ratio of the inverter 13. The ECU 16 has an input port which is supplied with a divided voltage produced by a variable resistor depending on the depth to which an accelerator pedal 17 is depressed.

The ECU 16 comprises a microcomputer, for example, in the form of a one-chip LSI device including a microprocessor unit (MPU) corresponding to a central processing unit (CPU), A/D and D/A converters connected as input and output devices to the microprocessor, I/O ports, a read-only memory (ROM) which stores a system program, etc., a random-access memory (RAM, write-read memory) for temporarily storing processed data, a timer circuit, an interrupt processing circuit, etc.

The battery 15 comprises a nickel-metal hydride secondary battery which suffers a phenomenon in which its voltage drops sharply while being discharged after repeated charging and discharging with a low DOD, i.e., a so-called memory effect, but which is small and has a high output and a high capacity.

A process of establishing an initial output Pmaxi of the battery 15 which has such a memory effect will be described below.

It is known that an output reduction Pm caused by the memory effect is substantially constant even when charging and discharging cycles are repeated. When the DOD is 80%, the output reduction Pm is about 12% to 15% of the initial output Pmaxi.

An output reduction Pct caused by aging of the battery 15 is represented by $\alpha t$ where $\alpha$ (constant) is an output deterioration coefficient of the battery 15 at the number t of times that the battery 15 is charged and discharged. If the prescribed number of times that the battery 15 is charged and discharged is n, then an output reduction Pcn when the battery 15 is charged and discharged n times is expressed by Pcn=$\alpha$n.

In view of the initial output Pmaxi, an output (maximum output) Pmax of the battery 15 after it is charged and discharged t times is represented by the following equation (1) and an output Pmax of the battery 15 after it is charged and discharged n times is represented by the following equation (2):

$$Pmax = Pmaxi - \alpha t \qquad (1)$$

$$Pmax = Pmaxi - \alpha n = Pmaxi - Pcn \qquad (2)$$

For calculating the output reduction Pcn caused by aging, the prescribed number n of times that the battery 15 is charged and discharged may be replaced with an guaranteed distance which the electrically propelled vehicle can travel without the battery 15 being replaced with a new battery 15, stated otherwise, a prescribed distance which the electrically propelled vehicle can travel with the single battery 15 that was installed on the electrically propelled vehicle when it was purchased.

An established power output Pl is determined in view of practicality and impressions because accelerating forces produced by depression of the accelerator pedal 17 are adjusted on the basis of the established power output Pl of the motor 12. The established power output Pl is a maximum output which the electrically propelled vehicle 11 can produce. That is, the electrically propelled vehicle 11 is constructed such that it cannot produce a power output greater than the established power output Pl. The above order may be any order. From the foregoing, the initial output Pmaxi of the battery 15 is determined based on the following formula (3):

$$Pmaxi > Pl + Pm + Pcn = \text{(established power output)} - \qquad (3)$$

$$\text{(output reduction due to the memory effect)} +$$

$$\text{(output reduction due to aging)}$$

Actually, the initial output Pmaxi may be set to a value greater than the right-hand side of the formula (3) to which there has been added an electric loss between the motor 12 and the battery 15, e.g., an electric loss $\Delta P$ due to the efficiency of the inverter 13, the contact resistance of a contactor, and the resistances of wires (see FIG. 2).

By thus establishing the initial output Pmaxi, even when the output of the battery 15 is reduced due to its deterioration and also due to the memory effect while the battery 15 is charged and discharged the prescribed number n of times, stated otherwise, during a performance guarantee period of the electrically propelled vehicle 11, a minimum power output Plm (see FIG. 2) which the battery 15 has as its capability does not drop below the established power output Pl which is the maximum power output of the electrically propelled vehicle 11.

During the performance guarantee period of the electrically propelled vehicle 11, therefore, since the electrically propelled vehicle 11 can produce the established power output Pl at all times, the mileage of the electrically propelled vehicle 11 is prevented from being lowered due to an excessive depression of the accelerator pedal 17, and the battery 15 will not be replaced unnecessarily.

Now, for the benefit of a designing procedure, it will be considered how many times the initial output Pmaxi of the battery 15 should be greater than the established power output Pl of the motor 12 once the established power output Pl is determined. For an easier understanding, the electric loss ΔP will not be taken into consideration.

First, a lower limit ratio for (the initial output Pmaxi)/(the established power output Pl) will be described below.

The output reduction Pm due to the memory effect is about 12% to 15% of the initial output Pmaxi. If the reasonable output reduction (output deterioration) Pcn due to aging is considered to be about 25% of the initial output Pmaxi, then a lower limit for the initial output Pmaxi of the battery 15 may be set to about 1.4 times the established power output Pl of the motor 12 taking into account the sum of the above output reductions.

Next, an upper limit for the initial output Pmaxi/the established power output Pl will be described below.

A limit beyond which the electrically propelled vehicle 11 can exhibit practical running performance in a traffic environment where gasoline-driven vehicles also run is 25 W/kg in terms of a power-to-weight ratio PW. This value takes into account the running performance of a lightweight automobile, and is considered to be lower-limit performance to be maintained when the electrically propelled vehicle is to join the main lane of a freeway. The ratio of the weight of the battery 15 to the weight of the vehicle should preferably be 0.3 or less.

Therefore, a practical lower limit for the power output of the motor 12, i.e., the established power output Pl, is calculated as 25 W/kg 0.3=83.3 W/kg.

If the battery 15 comprises a nickel-metal hydride secondary battery, then the initial output Pmaxi is considered to be of about 210 W/kg. Therefore, an upper limit for Pmaxi/Pl is calculated as 210 W/kg 83.3 W/kg=2.52, and it will be understood that the upper limit for the initial output Pmaxi may be 2.52 times the established power output Pl or less.

Therefore, even if the power performance, i.e., the power-to-weight ratio PW of the vehicle, is increased to 25 W/kg or greater, and even if the ratio of the weight of the battery 15 to the weight of the vehicle is reduced to 0.3 or smaller, it is practical to set the ratio of the initial output Pmaxi of the battery to the power output Pl of the motor of the electrically propelled vehicle 11 finally to a value smaller than 2.52.

The output Pmax of the battery referred to above is of a value determined using the practical maximum output, and is determined according to an output which is obtained when a load current Iu flows to cause the battery voltage to be a practical lower-limit voltage Vu at the time the DOD is 80%. Specifically, the initial output Pmaxi of the battery is obtained as the product of Vu and Iu when the load current Iu flows to cause the battery voltage to be the practical lower-limit voltage Vu (when the rated voltage of a single battery is 12 V, the practical lower-limit voltage is set to 9 V) which is established as a lower-limit voltage required for the battery to energize the load (which is the motor on the electric vehicle) after the battery is discharged to the DOD of 80% when it is a brand-new battery.

The present invention is not limited to the above embodiment, but various modifications may be made therein without departing from the scope of the invention. For example, the electrically propelled vehicle may be a motorcycle, a truck, etc. other than a four-wheeled passenger vehicle.

According to the present invention, as described above, the initial output of the secondary battery is set to an output equal to or greater than the sum of the established power output of the motor, an output reduction due to the memory effect of the secondary battery, and an allowable output reduction due to aging of the secondary battery. Therefore, even if the secondary battery suffers the memory effect, the output of the battery is prevented from dropping below the established power output of the motor. Stated otherwise, since the established power output of the motor is determined taking into account the output reduction due to the memory effect and the output deterioration due to aging, the driver, which is the user of the electrically propelled vehicle, does not feel a reduction in the power performance of the electrically propelled vehicle, i.e., a reduction in the established power output of the motor, caused by the output reduction due to the memory effect and the output reduction due to aging even when those output reductions actually take place.

More specifically, the established power output of the motor can be guaranteed for the prescribed number of times that the battery on the electrically propelled vehicle is charged and discharged, i.e., for an entire period according to the specifications in which the battery can be used. Therefore, the battery is not replaced unnecessarily even when its output is reduced due to the memory effect. Inasmuch as the electrically propelled vehicle can run according to a mode discharge over the entire period, the mileage of the electrically propelled vehicle is prevented from being lowered.

According to the present invention, furthermore, if the battery comprises a nickel-metal hydride secondary battery, then the initial output (initial output density) of the nickel-metal hydride secondary battery is set to a value which is 1.4 to 2.52 times the established power output of the motor. Thus, the initial output of the battery can easily be established, and, in addition, the established initial output of the battery can easily be judged for validity.

Although a certain preferred embodiment of the present invention has been shown and described in detail, it should be understood that various changes and modifications may be made therein without departing from the scope of the appended claims.

What is claimed is:

1. An electrically propelled vehicle comprising:

a propulsive motor having an established power output; and a nickel-metal hydride secondary battery for supplying electric energy to the motor, said secondary battery having a memory effect;

said secondary battery having an initial output set to a value which is at least the sum of the established power output of the motor, an output reduction due to the memory effect of the secondary battery, and an allowable output reduction due to aging of the secondary battery.

2. An electrically propelled vehicle according to claim 1, wherein said initial output of the secondary battery is set to at least 1.4 times the established power output of the motor.

3. An electrically propelled vehicle according to claim 1, further comprising a drive source for energizing said motor, said drive source being inserted between said secondary battery and said motor, wherein said initial output of the secondary battery is set to a value including an output reduction caused by an electric loss produced by said drive source.

4. An electrically propelled vehicle comprising:

a propulsive motor having an established power output; and a nickel-metal hydride secondary battery for supplying electric energy to the motor, said nickel-metal hydride secondary battery having a memory effect;

said nickel-metal hydride secondary battery having an initial output set to a value which is 1.4 to 2.52 times the established power output of the motor.

5. An electrically propelled vehicle according to claim 4, further comprising a drive source for energizing said motor, said drive source being inserted between said nickel-metal hydride secondary battery and said motor, wherein said initial output of the nickel-metal hydride secondary battery is set to a value including an output reduction caused by an electric loss produced by said drive source.

* * * * *